United States Patent Office.

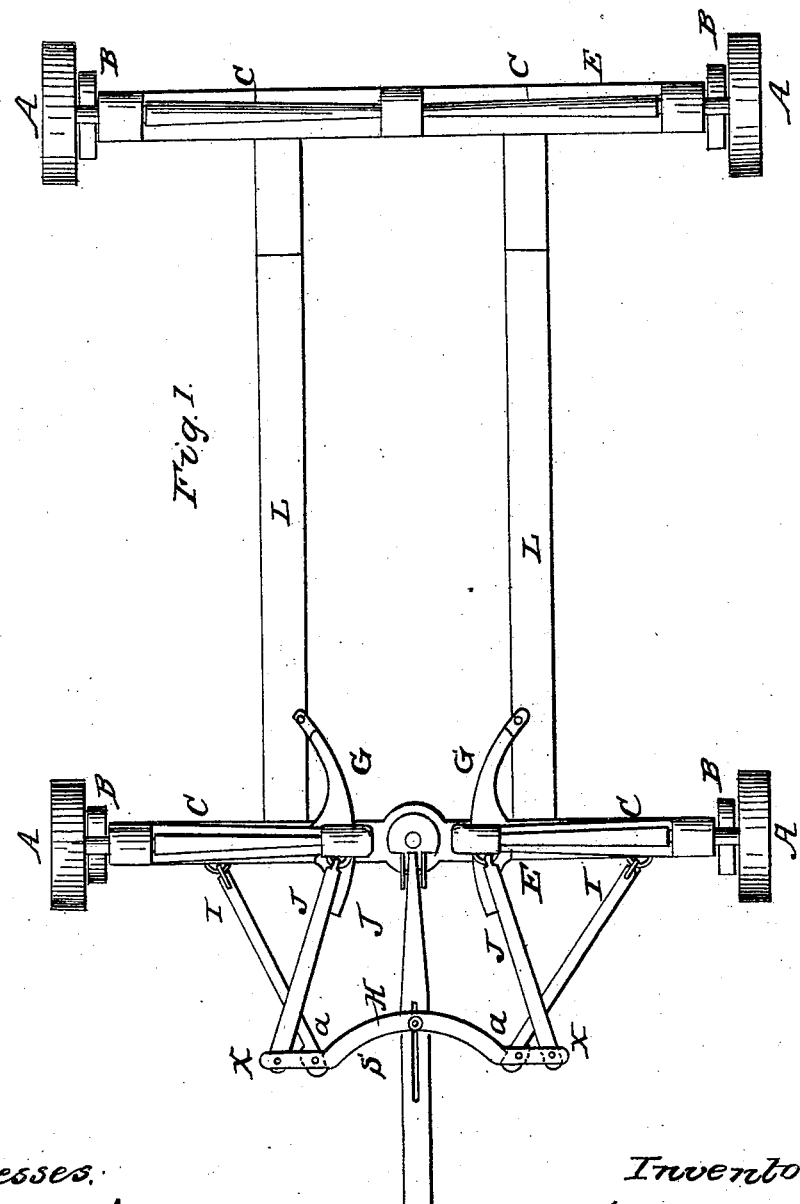

JAMES W. DREW, OF STOCKBRIDGE, MICHIGAN, JOSEPH N. TOWNSON ASSIGNEE OF ONE-HALF.

Letters Patent No. 64,850, dated May 21, 1867; antedated May 16, 1867.

IMPROVEMENT IN WHEEL VEHICLES.

The Schedule referred to in these Letters Patent and making part of the same.

TO ALL WHOM IT MAY CONCERN:

Be it known that I, JAMES W. DREW, of Stockbridge, Ingham county, and State of Michigan, have invented a new and useful Improvement in Wheel Vehicles; and I do hereby declare that the following is a full, clear, and exact description of the same, reference being had to the accompanying drawings, forming a part of this specification, in which—

Figure 1 represents an inverted plan of my invention.

Similar letters of reference in the view indicate corresponding parts.

The principal object of this invention is to construct a wagon in the most simple and perfect manner, and still retain the greatest possible strength, thereby combining cheapness with durability.

The nature of my invention and its peculiar advantages will be readily understood from the following description.

Fig. 1 represents a four-wheeled vehicle, which is supported by two hind wheels A A and two front wheels A A, the hind wheels being secured to ends of axles C C, and the front wheels to ends of axles C C. Each wheel is furnished with a separate axle C C C C, which revolves with the wheels A A A A, and have their bearings against friction-wheels B B B B which revolve with them as the wagon moves off. The body of my vehicle is very easily and firmly constructed, simply by two bolsters E E, and two reaches L L. This manner of constructing a wagon body obviates the rap or side motion of the tongue which is very fatiguing and tiresome to a team, especially when passing over rough roads or obstructions, which sometimes lie in their path. My invention, however, consists in constructing the front part of the vehicle, in arranging braces to move the divided axles for turning the vehicle around, and at the same time to support the tongue as strong as possible, and in arranging axle guides or supports G G in the strongest and most simple manner for making them durable and easily made, and to correspond with all other parts, as clearly shown in fig. 1. In order construct the steering arrangement and bracing of the tongue in as small a compass as possible, and have all parts work freely, it has been necessary to cross the four braces J J I I, and to crook the sway-bar H from points A A to bolt S, so as to make the bolts S and A, (at all times as near as possible,) come at right angles with the rods I I, which rods take the main part of the strain of the tongue when cramping. Said rods when cramping act upon the sway-bar H, and throwing the outer end around in a larger compass at the bolt X X draws upon the rod J, thus drawing forth the inner end of the axle C, and the opposite rod J acts backward against the opposite axle C, thus placing them in a proper position for turning the vehicle about.

Having thus described my invention, what I claim, and desire to secure by Letters Patent, is—

The crooked sway-bar H, and the cross-bars I and J, in combination with the axles C C, and the axle guides G G, the whole constructed and operating in the manner and for the purpose hereing described.

In testimony whereof that I acknowledge the above my own, I hereunto affix my signature in the presence of two witnesses.

JAMES W. DREW.

Witnesses:
BENJAMIN JUDSON,
ANNA JUDSON.